United States Patent [19]

Bailey et al.

[11] Patent Number: 4,920,735
[45] Date of Patent: May 1, 1990

[54] OPERATIONAL CARRIER FOR WHEEL-TYPE HAY RAKE

[76] Inventors: Gilber D. Bailey, 3978 Beechwood La., Dallas, Tex. 75220; James C. Bailey, Rte. 1, Cleburne, Tex. 76031

[21] Appl. No.: 383,336
[22] Filed: Jul. 20, 1989
[51] Int. Cl.$^5$ ............................................. A01D 67/00
[52] U.S. Cl. ...................................... 56/14.9; 56/367; 56/379; 56/DIG. 10 DIG. 14
[58] Field of Search ....................... 56/14.9, 15.9, 16.1, 56/16.3, 350, 367, 377, 378, 379, 384, 341, 344, DIG. 10, DIG. 14, DIG. 21

[56] References Cited

U.S. PATENT DOCUMENTS 4,785,614 11/1988 Schoenherr ............................ 56/367

FOREIGN PATENT DOCUMENTS 2332726 1/1975 Fed. Rep. of Germany ........ 56/377

Primary Examiner—Stephen J. Novosad
Assistant Examiner—Terry Lee Melius
Attorney, Agent, or Firm—William Scherback; H. Dennis Kelly

[57] ABSTRACT

An operational carrier for a wheel-type hay rake has an upper frame with one end for single point attachment to the draw bar of a towing vehicle. A lower frame is disposed beneath the upper frame and pivotally connected at one end to the upper frame. A first linkage is pivotally connected at one end to the upper frame and has an opposite end for attachment to the frame of the hay rake. The lower frame is provided with means for pivotally attaching an opposite end of the lower frame to the frame of the hay rake. Hydraulic means mounted on said upper frame has a piston rod connected to the lower frame for raising the lower frame to move the frame of the hay rake when said first linkage is connected to the frame of the hay rake in a substantially vertical direction from a raking position to a transport position.

5 Claims, 3 Drawing Sheets

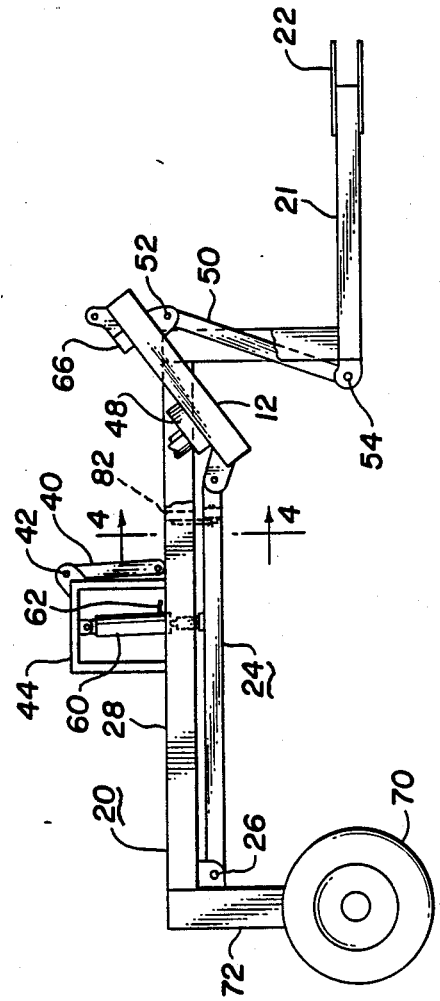
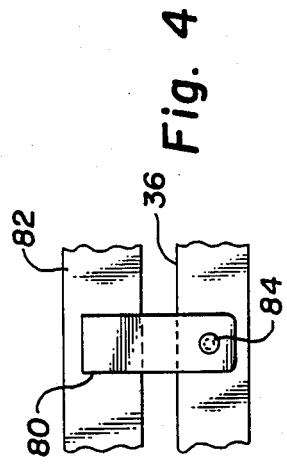

OPERATIONAL CARRIER FOR WHEEL-TYPE HAY RAKE

BACKGROUND OF THE INVENTION

1. Field of the Invention

This invention relates to a carrier for operationally supporting a wheel-type hay rake in a work mode and also in a transport mode and makes possible the use of a single point hitch to the draw bar of a towing vehicle.

2. Description of the Prior Art

Wheel-type hay rakes are popular farm machines. They are capable of efficiently gathering cut hay into windows for later gathering by baling machines. This type of rake, however, is heavy unwieldy and requires large towing vehicles such as tractors with which to operate because they are designed to be attached to the tractors by way of standard three-point hitches. The three-point hitch arrangement requires the entire weight of the rake to be supported by the tractor during transport thus dictating the use of larger and heavier farm machinery. In addition, the three-point hitch establishes a relatively rigid connection between the towing vehicle and the rake such that upon making a turn during a traverse of a hay field the rake swings wide and disturbs windrow being formed and leaves bunches of hay scattered about. Also, if the area to be raked is uneven and contains water diversion terraces, there is great difficulty encountered because the rake lifts off the ground when the front tractor wheels go into a low spot and the rake digs into the ground when the front wheels go into the depression. Also, because of the wide swing of the rake resulting from relatively small increments of the steering of the tractor, and the resultant bunching of hay, it is very difficult to rake following the contours of the terraces when using the three-point hitch, all the forgoing of which reduce the effectiveness of the gathering and baling procedure. Furthermore, with the use of the three-point hitch, the rake in transport position is raised so high as to cause the rake to engage or hit overhead obstructions thereby requiring the careful planning of the route taken in moving the rake from one worksite to another. In view of the deficiencies of the prior art arrangement it is an object of the present invention to provide apparatus which will permit sharper turns during the hay gathering process thus avoiding the upsetting of previously gathered windows of hay.

It is another object of the present invention to permit the use of smaller, less expensive tractors in the use of wheel-type hay rakes.

It is yet another object to reduce the overall height of the wheel-type hay rake during transport thereby to lessen the effective number of overhead obstructions thus decreasing the time involved in moving the rake from one worksite to another.

SUMMARY OF THE INVENTION

The operational carrier of the present invention comprises an upper frame having one end for single point attachment to the draw bar of a towing vehicle such as a tractor. A lower frame is disposed beneath the upper frame and pivotally connected at one end to the upper frame. An opposite end of the lower frame is provided with means for pivotally attaching it to the frame of the hay rake. A first linkage is hinged or pivotally connected at one end to the upper frame and has an opposite end for pivotal or hinged attachment to the frame of the wheel rake. A hydraulic means mounted on the upper frame has a piston rod connected to the lower frame for raising the lower frame to raise the frame of the hay rake. When the first linkage is connected to the frame of the hay rake, movement of the hay rake is in a substantially vertical direction from a raking position or mode, to a transport position or mode for movement about the job site without disturbing established windrows.

Further, in accordance with the present invention, the operational carrier includes a second link for use in lieu of the first link. The second link has one end for pivotal or hinged connection to the upper frame and an opposite for pivotal or hinged attachment to the frame of the hay rake so that upon vertical movement of the lower frame the frame of the hay rake will rotate towards a horizontal position to raise the wheels of the rake for movement of the hay rake from one job site to another.

Means are also provided for mechanically locking the upper and lower frames against relative movement when the frame of the hay rake is in a transport position or mode.

BRIEF DESCRIPTION OF THE DRAWINGS

FIG. 3 is a side view of the operational carrier of the present invention illustrating the frame of the hay rake moved into a transport position or mode and the upper and lower frames of the carrier mechanically locked against relative movement.

FIG. 4 is a partial section along lines 4—4 of FIG. 3 illustrating details of the mechanical locking means for the upper and lower frames of the operational carrier.

DESCRIPTION OF THE PREFERRED EMBODIMENT

Figure 1:
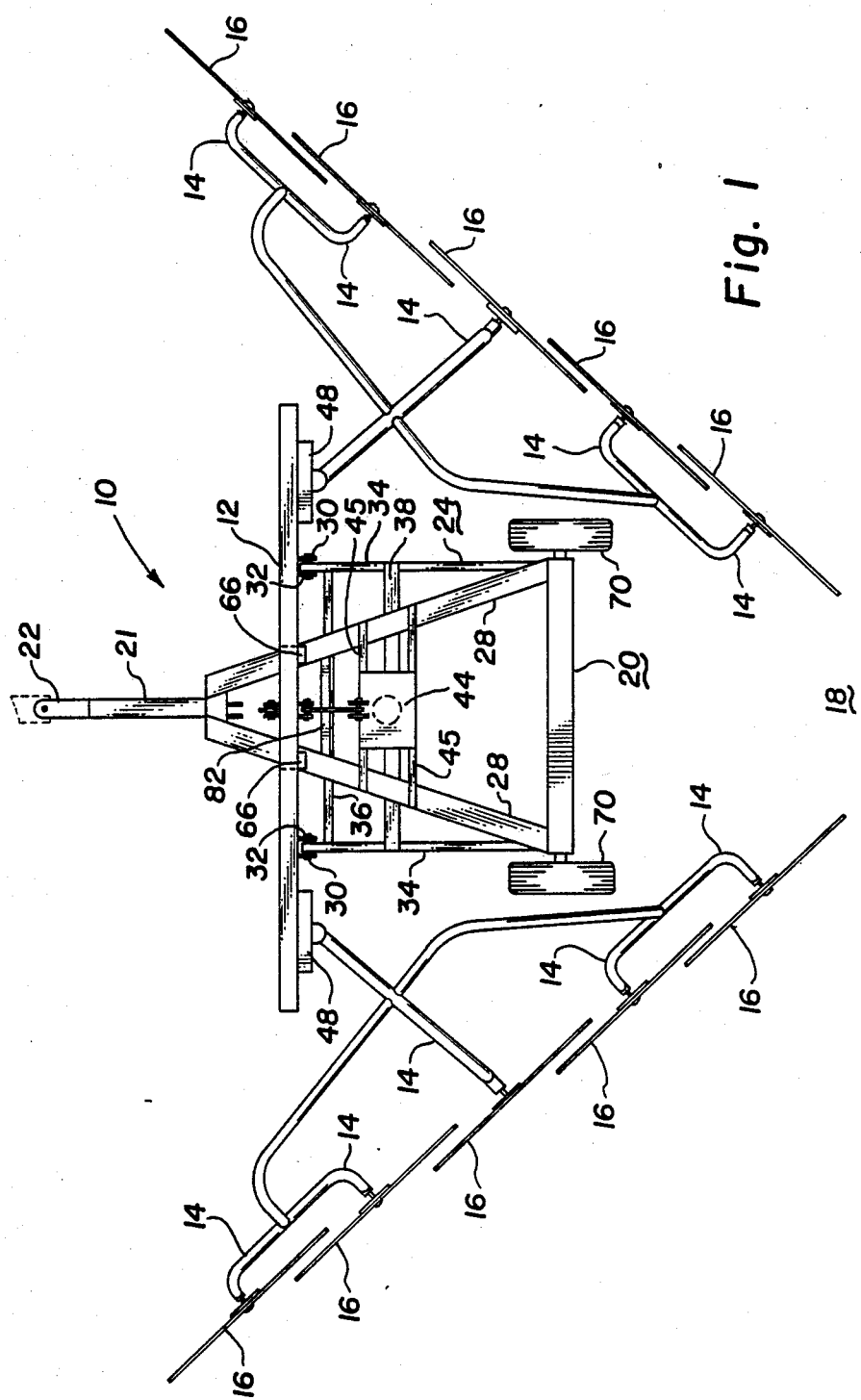
FIG. 1 is a top view of the preferred embodiment of the invention with a wheel-type hay rake mounted to the operational carrier of the present invention.

A preferred embodiment of the operational carrier of the present invention is identified generally by the reference character 10 having mounted thereon a frame 12 of a wheel-type hay rake. One suitable type of hay rake is sold as a Sitrex series RP5 rake manufactured in Trestina, Italy. The rake includes a plurality of arms 14 having mounted at their extremities wheels 16 comprised of flexible tines or prongs with the wheels arranged in partially overlapping relation.

With the hay rake lowered to a work position the tines or prongs of the wheels 16 engage the mown hay and as the rake is towed the wheels 16 gather the mown hay to form windrows at location 18 behind the hay rake. It is quite evident that should the hay rake, as is customary, be attached to a towing vehicle by way of a three-point hitch, extreme care has to be exercised in following contours in order to avoid disturbing the windrows that are being formed.

The operational carrier 10 of the present invention provides all the functions of a three-point hitch such as raising and lowering the wheel-type hay rake but makes the gathering of mown hay so more effective and efficient by way of a single point hitch while requiring only a small tractor to tow the rake.

Figure 2:
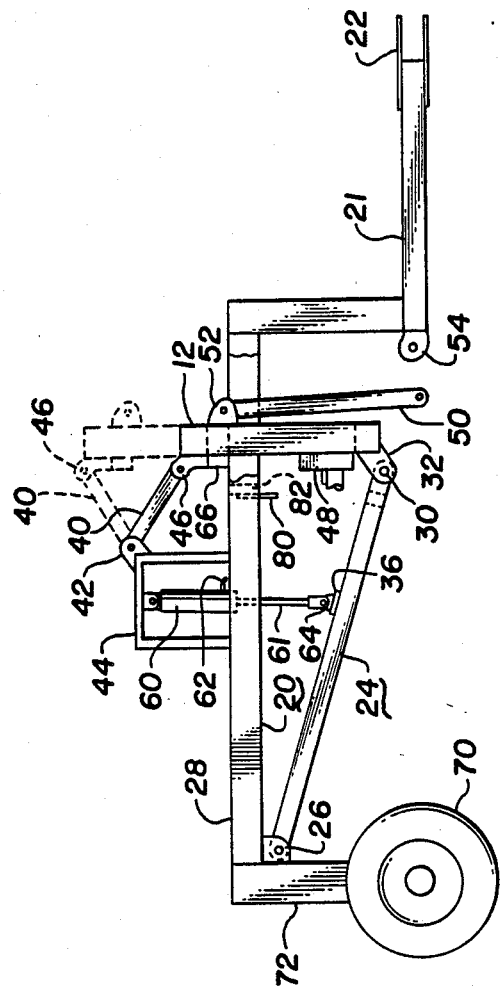
FIG. 2 is a side view of the operational carrier of the present invention illustrating the frame of the wheel-type hay rake in an operational mode with the working wheels of the hay rake removed for purpose of clarity.

As illustrated in FIG. 2 the operational carrier 10 comprises an upper frame 20 which has an inverted U-shaped configuration with an arm extending therefrom and carrying hitching apparatus 22 for connection to a single point hitch of a towing vehicle such as a tractor (not shown). The upper frame 20 as seen in FIG. 1, includes elements 28 forming the upper portion thereof. The spacing between elements 28 decreases toward the front of the carrier 10, reaching a minimum at the point where the frame 20 is attached to arm 21.

Pivotally connected at one end and disposed beneath the upper frame is a lower frame 24 pivotally connected or hinged at 26 to the upper frame at two-spaced points (FIG. 1). The opposite ends of the lower frame are provided with means for pivotally attaching lower frame to the frame 12 of the wheel-type rake. More specifically the pivotal connection is implemented by providing the lower ends of the frame with apertures for receiving a pin 30 with the apertured ends of the frame being received between spaced perforated plates 32 secured as by welding to the frame 12 of the wheel rake. This arrangement is best shown in FIG. 1 where the lower frame is shown comprised of two-spaced arms 34 rigidly interconnected by first and second cross pieces respectively 36 and 38.

A first linkage 40 is shown having one end pivotally connected at 42 to an open sided housing 44 secured to cross pieces 45 mounted at the upper surface of the upper frame 20 and an opposite end of linkage 42 is pivotally connected as at 46 to the frame 12 of the wheel-type rake. A second linkage 50 is pivotally connected at 52 to the opposite side of the frame 12 and has an opposite end pivotally connected at 54 to the upper frame 20.

As shown in FIG. 2 with the linkage 40 connected to the frames the apparatus is in a work position with the tines of the wheels 16 (FIG. 1) lowered to engage the mown hay and prepared to gather mown hay into windrows. It is preferred in operation of the present invention that the linkage 50 be disconnected when the apparatus is in the work mode. More particularly, the linkage may be disconnected at 54 and left depending from the pivotal connection at 52.

When it is desired to move the wheel-type hay rake to another work location in the field, and with the linkage 50 disconnected, the lower frame is raised lifting the frame 12 vertically to the position shown in dash lines under control of the linkage 40.

The lower frame 24 is raised hydraulically by way of a hydraulic cylinder and piston 60 assembly deriving hydraulic power by way of conduit 62 from a pump located on the tractor (not shown). A piston rod 61 of the assembly 60 is pivotally connected at 64 to the cross member 36 of the lower frame. The upper end of piston 60 is pivotally connected to housing 44.

When a new work location is arrived at on the work site or field, hydraulic pressure is removed from the piston 60 and the weight of the wheel-type hay rake, through gravitational forces, causes the rake to move downward to a work position limited by stops 66, attached to by welding into the frame 12 of the rake, which contact elements 28 of the upper frame 20.

Mobility is afforded the operational carrier by providing wheels 70 mounted to the extremities of spaced depending elements or legs 72 of the upper frame. The wheels are pneumatic and sufficiently large both for towing the hay rake across fields during hay gathering and for movement along roads when transporting the hay rake from one work site to another. With the construction as shown including the single point hitch, the hay rake can be moved from one job site to another utilizing a pickup truck rather than the slower moving tractor. The choice being dependent upon the circumstances.

When transporting the hay rake from one job site to another, the linkage 40 first is released from its pivotal connection at 46 and the linkage 50 is connected both to the upper frame 20 at 54 and to the hay rake frame 12 at 52. Now when the lower frame 24 is raised relative to the upper frame 20 the frame 12 of the hay rake will be rotated toward a horizontal position as shown in FIG. 3 with the tined wheels raised well above road surface but not to the height typically reached by raising the hay rake from a tractor utilizing a three-point hitch. The sets of wheels 16 and arms 14 are rotated about mounting structure to a position where they are approximately parallel to one another with the planes of the wheels 16 approximately parallel to the earth's surface.

When moving the hay rake from one work site to another the upper and lower frames are mechanically locked together. This is a precautionary step taken in the event that hydraulic power is lost to the piston 60 which loss would otherwise cause the hay rake through gravitational forces to move or rotate back with the tined wheels engaging the road surface.

The mechanical locking of the upper and lower frames is accomplished by apparatus which includes a perforated plate 80 (FIG. 4) attached as by welding to a cross piece 82 secured to the upper frame 20. The lower end of the plate 80 is perforated to receive a pin or bolt 84 and the perforation in the element 80 is aligned, when the lower frame is in its uppermost position, with a hole or aperture formed in the cross piece 36 of the lower frame. Bolt or pin 84 passing through the aligned apertures secures the upper and lower frames against movement and avoids the accidental lowering of the hay rake during transport.

The invention has been described in only the preferred embodiment. Various changes and modifications may be made without departing from the spirit and scope of the invention as described by the appended claims.

What is claimed is:

1. An operational carrier for a wheel-type hay rake comprising:
   an upper frame having one end for single point attachment to the draw bar of a towing vehicle,
   a lower frame disposed beneath said upper frame and pivotally connected at one end to said upper frame,
   a first linkage pivotally connected at one end to said upper frame and having an opposite end for attachment to a frame of the hay rake
   said lower frame being provided with means for pivotally attaching an opposite end of said lower frame to the frame of the hay rake, and
   hydraulic means mounted on said upper frame and having a piston rod connected to said lower frame for raising said lower frame to move the frame of the hay rake, when said first linkage is connected to the frame of the hay rake, in a substantially vertical direction from a raking position to a transport position.

2. The operational carrier of claim 1 including means for mechanically locking said upper and lower frames against relative movement when the frame of the hay rake is in a transport position.

3. The operational carrier of claim 2 including a second link for use in lieu of said first link and having one end for pivotal connection to said upper frame and an opposite end for pivotal attachment to the frame of the hay rake whereupon vertical movement of said lower frame will cause the frame of the hay rake to rotate toward a substantially horizontal position for movement of the hay rake from one job site to another.

4. The operational carrier of claim 1 in which said upper frame includes two spaced depending elements, and a wheel mounted to each of said depending elements at the lower extremities thereof.

5. Apparatus for gathering cut hay into windrows comprising an upper frame having one end for single point attachment to the draw bar of a towing vehicle, and
a lower frame pivotally mounted at one end to and positioned beneath said upper frame,
a wheel-type hay rake having a frame with a plurality of wheel-type rakes rotatably mounted on opposite sides thereof and in a straddling position relative to said upper and lower frames;
a first linkage pivotally connected at one end to said upper frame and having an opposite end for attachment to said frame of the hay rake
said lower frame being provided with means for pivotally attaching an opposite end of said lower frame to said frame of said hay rake, and
hydraulic means mounted on said upper frame and having a piston rod connected to said lower frame to move said frame of said hay rake, when said first linkage is attached to the frame of said hay rake, in a substantially vertical direction from a raking position to a transport position.

* * * * *

UNITED STATES PATENT AND TRADEMARK OFFICE
CERTIFICATE OF CORRECTION

PATENT NO. : 4,920,735

DATED : May 1, 1990

INVENTOR(S) : Bailey et al.

It is certified that error appears in the above-identified patent and that said Letters Patent is hereby corrected as shown below:

Title page:

The inventor's name reading "Gilber D. Bailey" should read --Gilbert D. Bailey--.

Signed and Sealed this

Third Day of September, 1991

Attest:

HARRY F. MANBECK, JR.

Attesting Officer

Commissioner of Patents and Trademarks